US009052721B1

(12) United States Patent
Dowdall et al.

(10) Patent No.: US 9,052,721 B1
(45) Date of Patent: Jun. 9, 2015

(54) METHOD FOR CORRECTING ALIGNMENT OF VEHICLE MOUNTED LASER SCANS WITH AN ELEVATION MAP FOR OBSTACLE DETECTION (75) Inventors: Jonathan Baldwin Dowdall, Oakland, CA (US); Dmitri Dolgov, Mountain View, CA (US); David Ian Ferguson, San Francisco, CA (US); Jiajun Zhu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 248 days.

(21) Appl. No.: 13/597,143

(22) Filed: Aug. 28, 2012

(51) Int. Cl.
G05D 1/02 (2006.01)
B64D 45/00 (2006.01)

(52) U.S. Cl.
CPC .............. *G05D 1/0272* (2013.01); *B64D 45/00* (2013.01)

(58) Field of Classification Search
CPC ............... G05D 1/0272; G05D 1/027; G05D 2201/0216; G05D 1/0278; G05D 1/0255; G06K 9/46; G06T 2207/30252; G07C 5/085; B64D 45/00; G01C 21/16
USPC .......................................................... 701/23
See application file for complete search history.

(56) References Cited

U.S. PATENT DOCUMENTS

| | | | | | |
|---|---|---|---|---|---|
| 5,988,862 | A | * | 11/1999 | Kacyra et al. | 703/6 |
| 6,151,539 | A | | 11/2000 | Bergholz et al. | |
| 6,246,468 | B1 | * | 6/2001 | Dimsdale | 356/4.02 |
| 6,473,079 | B1 | * | 10/2002 | Kacyra et al. | 345/419 |
| 6,512,518 | B2 | * | 1/2003 | Dimsdale | 345/427 |
| 6,512,993 | B2 | * | 1/2003 | Kacyra et al. | 702/159 |
| 6,604,068 | B1 | * | 8/2003 | Bukowski et al. | 703/22 |
| 6,619,406 | B1 | * | 9/2003 | Kacyra et al. | 172/4.5 |
| 6,734,849 | B2 | * | 5/2004 | Dimsdale et al. | 345/419 |
| 6,771,840 | B1 | * | 8/2004 | Ioannou et al. | 382/285 |
| 6,781,683 | B2 | * | 8/2004 | Kacyra et al. | 356/141.1 |
| 6,804,380 | B1 | * | 10/2004 | Ioannou et al. | 382/103 |
| 7,184,036 | B2 | * | 2/2007 | Dimsdale et al. | 345/419 |
| 7,215,430 | B2 | * | 5/2007 | Kacyra et al. | 356/601 |

(Continued)

OTHER PUBLICATIONS

Segmentation of 3D lidar data in non-flat urban environments using a local convexity criterion, Intelligent Vehicles Symposium, 2009 IEEE Date of Conference: Jun. 3-5, 2009 Author(s): Moosmann, F.; Inst. fur Mess- and Regelungstech., Univ. Karlsruhe (TH), Karlsruhe, Germany; Pink, O.; Stiller, C.; pp. 215-220; Product Type: Conference Publica.*

(Continued)

*Primary Examiner* — James Trammell
*Assistant Examiner* — James E Stroud
(74) *Attorney, Agent, or Firm* — McDonnell Boehnen Hulbert & Berghoff LLP (57) ABSTRACT

Methods and systems for alignment of light detection and ranging (LIDAR) data are described. In some examples, a computing device of a vehicle may be configured to compare a three-dimensional (3D) point cloud to a reference 3D point cloud to detect obstacles on a road. However, in examples, the 3D point cloud and the reference 3D point cloud may be misaligned. To align the 3D point cloud with the reference 3D point cloud, the computing device may be configured to determine a planar feature in the 3D point cloud of the road and a corresponding planar feature in the reference 3D point cloud. Further, the computing device may be configured to determine, based on comparison of the planar feature to the corresponding planar feature, a transform. The computing device may be configured to apply the transform to align the 3D point cloud with the reference 3D point cloud.

20 Claims, 7 Drawing Sheets

(56) References Cited

U.S. PATENT DOCUMENTS

| | | | |
|---|---|---|---|
| 7,313,506 B2* | 12/2007 | Kacyra et al. | 703/6 |
| 7,657,373 B2* | 2/2010 | Kindo | 701/413 |
| 7,742,841 B2 | 6/2010 | Sakai et al. | |
| 8,195,394 B1 | 6/2012 | Zhu et al. | |
| 8,352,112 B2* | 1/2013 | Mudalige | 701/24 |
| 2002/0149585 A1* | 10/2002 | Kacyra et al. | 345/428 |
| 2003/0001835 A1* | 1/2003 | Dimsdale et al. | 345/419 |
| 2010/0030473 A1 | 2/2010 | Au et al. | |
| 2010/0114416 A1 | 5/2010 | Au et al. | |
| 2010/0176987 A1* | 7/2010 | Hoshizaki | 342/357.02 |
| 2010/0256836 A1* | 10/2010 | Mudalige | 701/2 |
| 2011/0137527 A1* | 6/2011 | Simon et al. | 701/45 |
| 2011/0190972 A1* | 8/2011 | Timmons et al. | 701/29 |
| 2011/0304736 A1* | 12/2011 | Evans et al. | 348/169 |
| 2011/0304737 A1* | 12/2011 | Evans et al. | 348/169 |
| 2013/0027554 A1* | 1/2013 | Meadow | 348/144 |
| 2013/0027555 A1* | 1/2013 | Meadow | 348/144 |
| 2013/0120736 A1* | 5/2013 | Bosse et al. | 356/4.01 |
| 2013/0300740 A1* | 11/2013 | Snyder et al. | 345/420 |

OTHER PUBLICATIONS

"HDS-Laser-Scanners-SW_5570"; http://hds.leica-geosystems.com/en/HDS-Laser-Scanners-SW_5570.htm; retrieved Dec. 10, 2013.*

"Cyrax (HDS system)"; http://en.wikipedia.org/wiki/Cyrax_(HDS_system); retrieved Dec. 10, 2013.*

"3D_scanner"; http://en.wikipedia.org/wiki/3D_scanner; retrieved Dec. 10, 2013.*

"86128-cyra-technologies-cyrax"; http://www.pobonline.com/articles/86128-cyra-technologies-cyrax-2500-3d-laser-scanner; retrieved Dec. 10, 2013.*

"SIGGRAPH 2001-Cyra technologies-Cyrax"; http://www.siggraph.org/s2001/exhibition/detail/67.html; retrieved Dec. 10, 2013.*

* cited by examiner

COMPUTER PROGRAM PRODUCT 700

SIGNAL BEARING MEDIUM 701

PROGRAM INSTRUCTIONS 702

- RECEIVING, AT A COMPUTING DEVICE CONFIGURED TO CONTROL A VEHICLE, FROM A LIGHT DETECTION AND RANGING (LIDAR) DEVICE COUPLED TO THE VEHICLE, LIDAR-BASED INFORMATION COMPRISING A THREE-DIMENSIONAL (3D) POINT CLOUD, THE 3D POINT CLOUD MAY COMPRISE POINTS CORRESPONDING TO LIGHT EMITTED FROM THE LIDAR DEVICE AND REFLECTED FROM A SURFACE OF A ROAD ON WHICH THE VEHICLE IS TRAVELLING AND FROM ONE OR MORE OBSTACLES ON THE ROAD, AND THE COMPUTING DEVICE MAY HAVE ACCESS TO A REFERENCE 3D POINT CLOUD

- DETERMINING, USING THE COMPUTING DEVICE, A PLANAR FEATURE IN THE 3D POINT CLOUD, AND A CORRESPONDING PLANAR FEATURE IN THE REFERENCE 3D POINT CLOUD

- DETERMINING, BASED ON A COMPARISON OF THE PLANAR FEATURE TO THE CORRESPONDING PLANAR FEATURE, A TRANSFORM

- APPLYING THE TRANSFORM TO ALIGN THE 3D POINT CLOUD WITH THE REFERENCE 3D POINT CLOUD

| COMPUTER READABLE MEDIUM 703 | COMPUTER RECORDABLE MEDIUM 704 | COMMUNICATIONS MEDIUM 705 |

FIGURE 7

METHOD FOR CORRECTING ALIGNMENT OF VEHICLE MOUNTED LASER SCANS WITH AN ELEVATION MAP FOR OBSTACLE DETECTION

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present application discloses embodiments that relate to alignment of light detection and ranging data. In one aspect, the present application describes a method. The method comprises receiving, at a computing device configured to control a vehicle, from a light detection and ranging (LIDAR) device coupled to the vehicle, LIDAR-based information comprising a three-dimensional (3D) point cloud. The 3D point cloud comprises points corresponding to light emitted from the LIDAR device and reflected from a surface of a road on which the vehicle is travelling and from one or more obstacles on the road. The computing device has access to a reference 3D point cloud. The method also comprises determining, using the computing device, a planar feature in the 3D point cloud, and a corresponding planar feature in the reference 3D point cloud. The method further comprises determining, based on a comparison of the planar feature to the corresponding planar feature, a transform; and applying the transform to align the 3D point cloud with the reference 3D point cloud.

In another aspect, the present application describes a non-transitory computer readable medium having stored thereon instructions executable by a computing device to cause the computing device to perform functions. The functions comprise receiving, from a light detection and ranging (LIDAR) device coupled to a vehicle, LIDAR-based information comprising a three-dimensional (3D) point cloud. The 3D point cloud comprises points corresponding to light emitted from the LIDAR device and reflected from a surface of a road on which the vehicle is travelling and from one or more obstacles on the road. The functions also comprise determining a planar feature in the 3D point cloud, and a corresponding planar feature in a reference 3D point cloud. The functions further comprise determining, based on a comparison of the planar feature to the corresponding planar feature, a transform; and applying the transform to align the 3D point cloud with the reference 3D point cloud.

In still another aspect, the present application describes a control system for a vehicle. The control system comprises a light detection and ranging (LIDAR) device configured to provide LIDAR-based information comprising a three-dimensional (3D) point cloud. The 3D point cloud comprises points corresponding to light emitted from the LIDAR device and reflected from a surface of a road on which the vehicle is travelling and from one or more obstacles on the road. The control system also comprises a computing device in communication with the LIDAR device. The computing device has access to a reference 3D point cloud. The computing device is configured to receive the LIDAR-based information. The computing device is also configured to determine a planar feature in the 3D point cloud, and a corresponding planar feature in the reference 3D point cloud. The computing device is further configured to determine, based on a comparison of the planar feature to the corresponding planar feature, a transform; and apply the transform to align the 3D point cloud with the reference 3D point cloud.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

An autonomous vehicle operating on a road may rely on detection of obstacles or objects on the road for navigation. In some examples, a computing device, configured to control the vehicle, may be configured to compare a three-dimensional (3D) point cloud, received from a light detection and ranging (LIDAR) sensor coupled to the vehicle, to a reference 3D point cloud to detect the obstacles on the road. In examples, the reference 3D point cloud may have been captured at an earlier time and stored on the computing device, and may represent an obstacle-free elevation map of the road.

In some examples, however, the 3D point cloud and the reference 3D point cloud may be misaligned. For example, the 3D point cloud may have been obtained from a given LIDAR device pose (e.g., a combination of position and orientation of the LIDAR device relative to the road), while the reference 3D point cloud may have been obtained from another vehicle and from a different LIDAR device pose. Such difference in LIDAR device pose may preclude alignment of the 3D point cloud to the reference 3D point cloud. To align the 3D point cloud with the reference 3D point cloud, the computing device may be configured to determine a planar feature in the 3D point cloud of the road. The planar feature, for example, may correspond to a ground plane of a surface of the road on which the vehicle is travelling. The computing device also may be configured to determine a latitude, longitude, and yaw angle of the vehicle at a location of the vehicle on the road where the 3D point cloud is captured, and accordingly determine a corresponding planar feature in the reference 3D point cloud.

Further, the computing device may be configured to determine, based on a comparison of the planar feature to the corresponding planar feature, a transform. As an example, to determine the transform, the computing device may be configured to determine a difference in pitch angle, roll angle, or elevation of the planar feature compared to the corresponding planar feature. The computing device may be configured to apply the transform to points of the 3D point cloud or respective points of the reference 3D point cloud to align the 3D point cloud with the reference 3D point cloud. Alignment of the 3D point cloud to the reference 3D point cloud may facilitate detection of obstacles on the road, and may also facilitate avoiding false detection of obstacles.

An example vehicle control system may be implemented in or may take the form of an automobile. Alternatively, a vehicle control system may be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Further, an example system may take the form of non-transitory computer-readable medium, which has program instructions stored thereon that are executable by at least one processor to provide the functionality described herein. An example system may also take the form of an automobile or a subsystem of an automobile that includes such a non-transitory computer-readable medium having such program instructions stored thereon.

Figure 1:
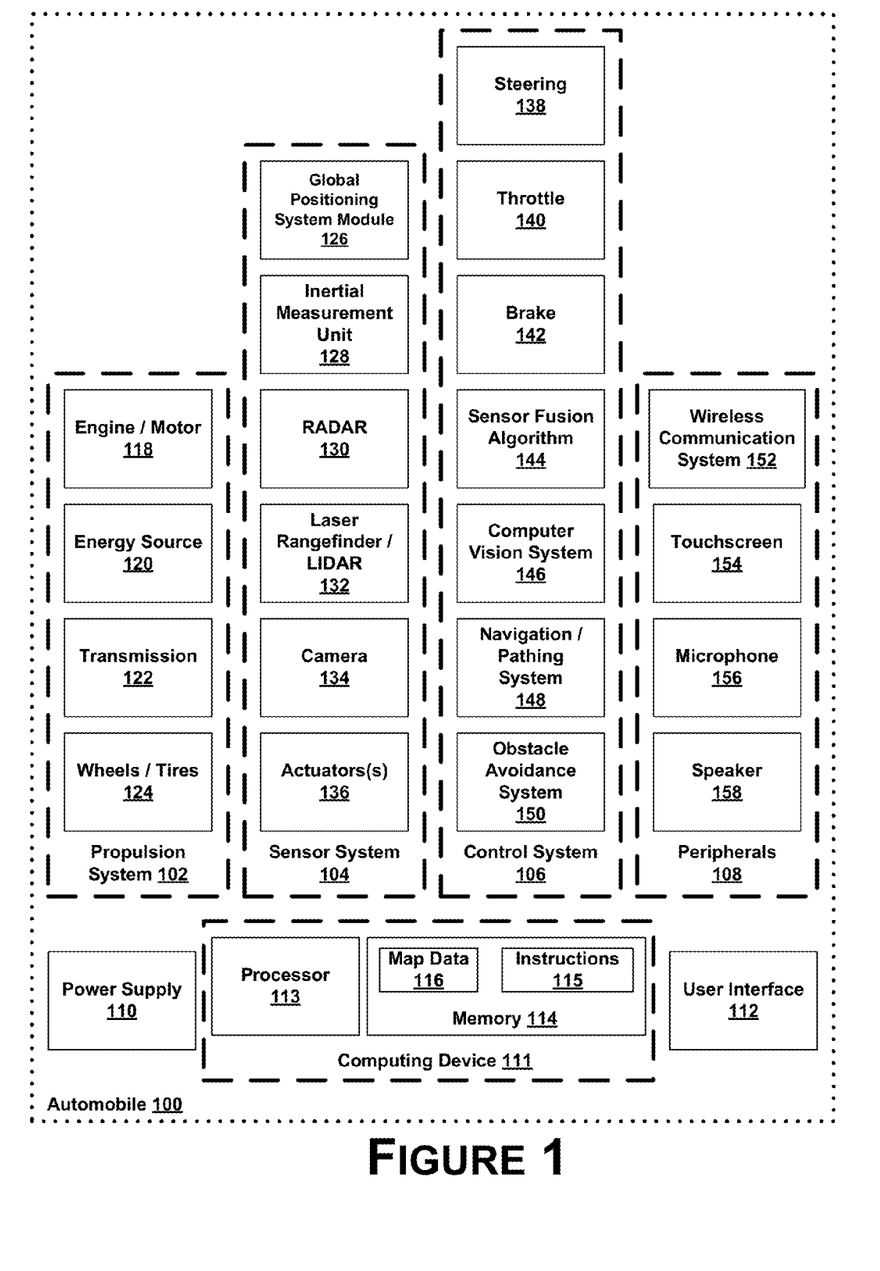
FIG. 1 is a simplified block diagram of an example automobile, in accordance with an example embodiment.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100

(e.g., an $O_2$ monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. The light can be any type of electromagnetic waves such as laser. As an example, the LIDAR unit 132 may include a laser source and/or laser scanner configured to emit pulses of laser and a detector configured to receive reflections of the laser. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems are shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
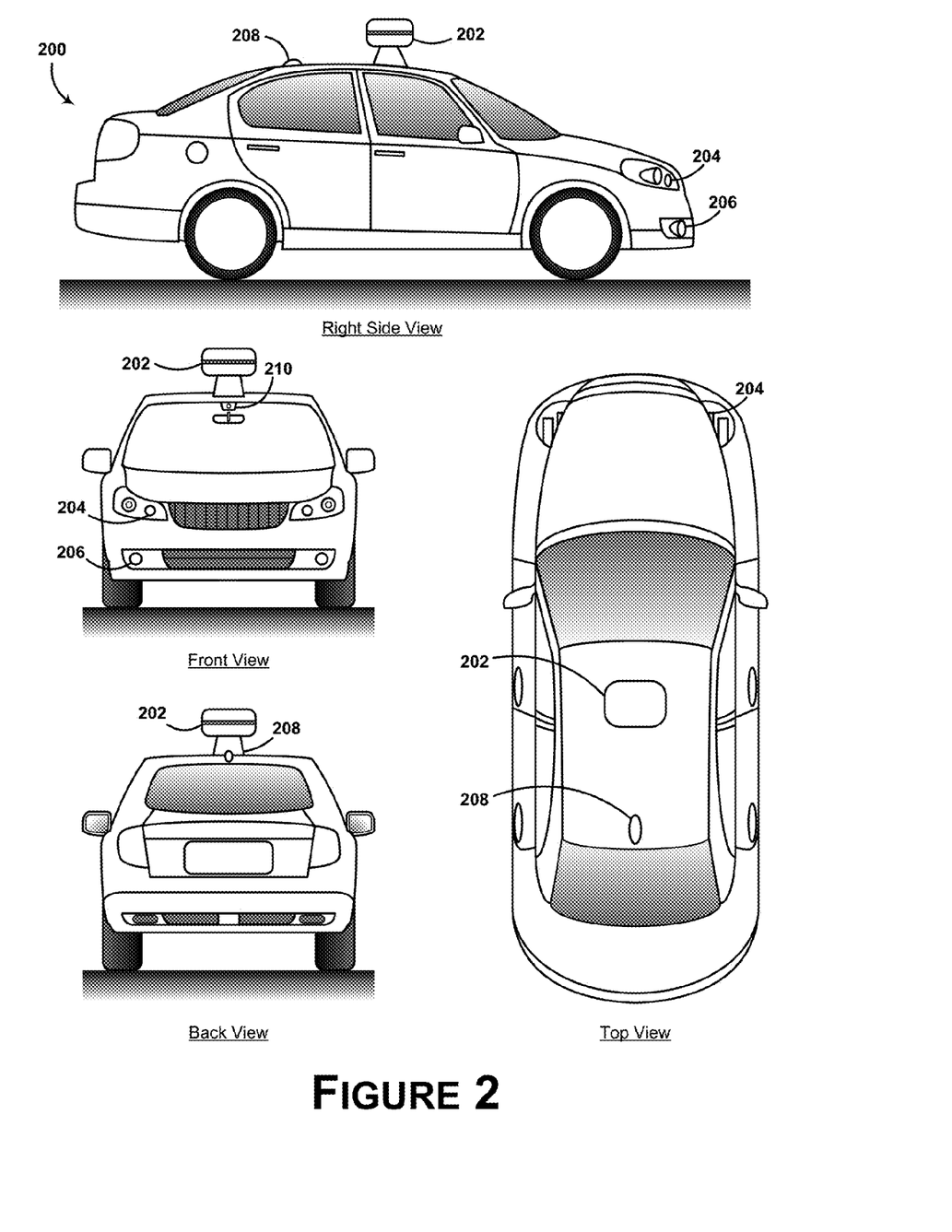
FIG. 2 illustrates an example automobile, in accordance with an example embodiment.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to control the automobile 200 in accordance with a control strategy from among multiple possible control strategies. The control system may be configured to receive information from sensors coupled to the automobile 200 (on or off the automobile 200), modify the control strategy (and an associated driving behavior) based on the information, and control the automobile 200 in accordance with the modified control strategy. The control system further may be configured to monitor the information received from the sensors, and continuously evaluate driving conditions; and also may be configured to modify the control strategy and driving behavior based on changes in the driving conditions.

As an example, the control system may be configured to detect obstacles (e.g., other vehicles, static objects, road changes, etc.) on a road; and may be configured to modify the control strategy based on detection of the obstacles. In some examples, to detect the obstacles, the control system of the automobile 200 may be configured to compare a 3D point cloud, received from a LIDAR device coupled to the automobile 200, to an obstacle-free reference 3D point cloud to detect the obstacles on the road. In some examples, however, the 3D point cloud and the reference 3D point cloud may be misaligned. Thus, to detect the obstacles, the control system may be configured to align the 3D point cloud with the 3D reference point cloud.

Figure 3:
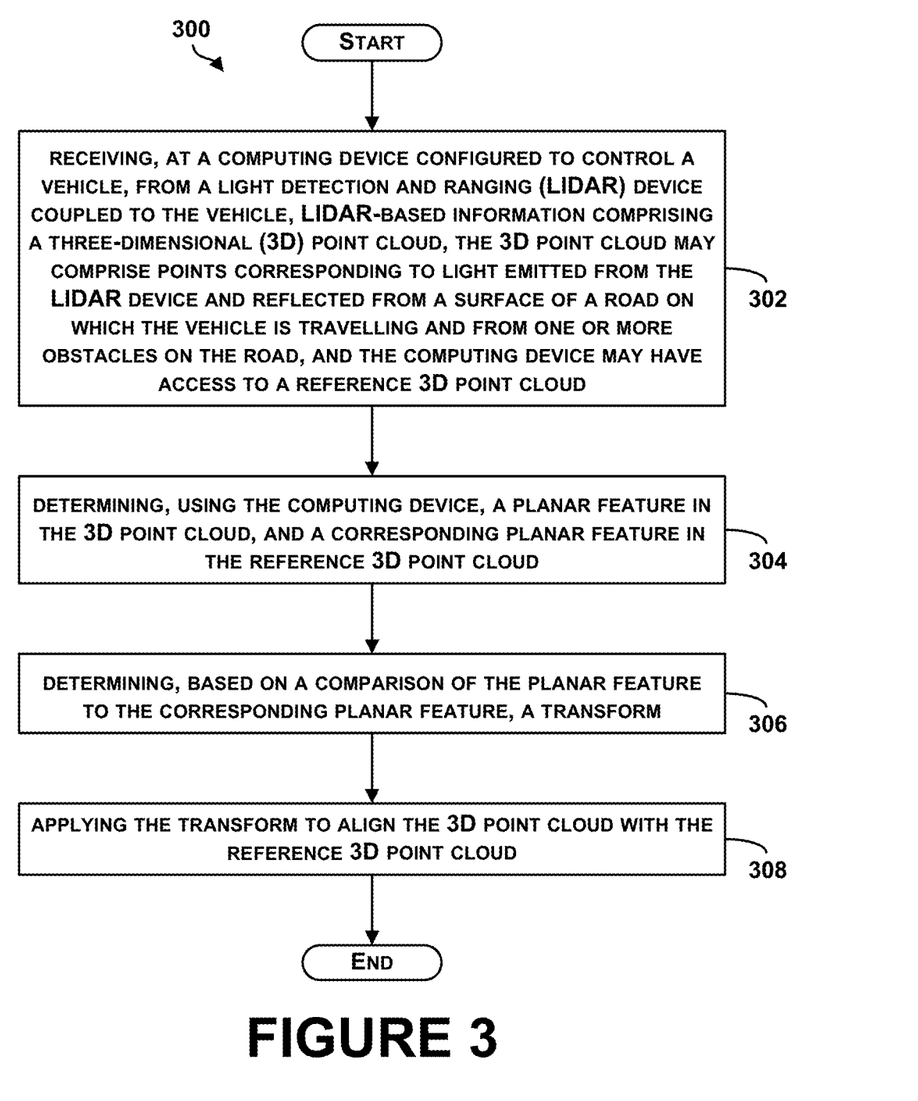
FIG. 3 is a flow chart of a method for alignment of light detection and ranging (LIDAR) data, in accordance with an example embodiment.

FIG. 3 is a flow chart of a method for alignment of light detection and ranging (LIDAR) data, in accordance with an example embodiment.

The method 300 may include one or more operations, functions, or actions as illustrated by one or more of blocks 302-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, the method 300 includes receiving, at a computing device configured to control a vehicle, from a light detection and ranging (LIDAR) device coupled to the vehicle, LIDAR-based information comprising a three-dimensional (3D) point cloud, the 3D point cloud comprises points corresponding to light emitted from the LIDAR device and reflected from a surface of a road on which the vehicle is travelling and from one or more obstacles on the road, and the computing device my have access to a reference 3D point cloud. The computing device may be onboard the vehicle or may be off-board but in wireless communication with the vehicle, for example. Also, the computing device may be configured to control the vehicle in an autonomous or semi-autonomous operation mode. Also, the computing device may be configured to receive, from sensors coupled to the vehicle, information associated with, for example, condition of systems and subsystems of the vehicle, driving conditions, road conditions, etc.

Further, a LIDAR device (e.g., the LIDAR unit 132 in FIG. 1) may be coupled to the vehicle and may be in communication with the computing device configured to control the vehicle. As described with respect to the LIDAR unit 132 in FIG. 1, operation of the LIDAR device may involve an optical remote sensing technology that enables measuring properties of scattered light to find range and/or other information of a distant target. The LIDAR device, for example, may be configured to emit laser pulses as a beam, and scan the beam to generate two dimensional or three dimensional range matrices. In an example, the range matrices may be used to determine distance to an object or surface by measuring time delay between transmission of a pulse and detection of a respective reflected signal.

In another example, the LIDAR device may be configured to rapidly scan an environment surrounding the vehicle in three dimensions. In some examples, more than one LIDAR device may be coupled to the vehicle to scan a complete 360° horizon of the vehicle. The LIDAR device may be configured to provide to the computing device a cloud of point data representing obstacles or objects, which have been hit by the laser, on the road and the vicinity of the road. The points may be represented by the LIDAR device in terms of azimuth and elevation angles, in addition to range, which can be converted to (X, Y, Z) point data relative to a local coordinate frame attached to the vehicle. Additionally, the LIDAR device may be configured to provide to the computing device intensity values of the light or laser reflected off the obstacles.

The reference 3D point cloud may have been captured at a previous time by the vehicle or other vehicles, and may be stored on a memory coupled to the computing device. In examples, the reference 3D point cloud may be determined by pre-processing several reference 3D point clouds captured by the vehicle or other vehicles over time. A single reference 3D point cloud may be constructed from the several reference 3D point clouds by, for example, overlapping and comparing the several reference 3D point clouds.

In an example, the reference 3D point cloud may relate to an obstacle-free elevation map of the road. Therefore, the computing device may be configured to compare the 3D point cloud captured at a current location of the vehicle to the reference 3D point cloud corresponding to the current location of the vehicle to detect or identify obstacles that are absent from the obstacle-free reference 3D point cloud, but are depicted in the 3D point cloud.

In examples, the computing device may be configured to determine a reference 3D point cloud corresponding to the 3D point cloud captured at a current location of the vehicle, based on the current location and orientation of the vehicle. For instance, a Global Position System (GPS) module may be coupled to the vehicle and may be configured to provide, to the computing device, location information relating to a current geographic location (i.e., with respect to the Earth, using satellite-based positioning data) of the vehicle on the road. For example, based on the location information, the computing device may be configured to determine latitude and longitude of the current geographic location of the vehicle. Additionally or alternatively, an Inertial Measurement Unit (IMU) may be coupled to the vehicle and may be configured to provide to the computing device orientation information associated with position and orientation changes (e.g., yaw angle) of the vehicle based on inertial acceleration. Based on the location information and orientation information, the computing device may be configured to determine a reference 3D point cloud, or a portion of a given reference 3D point cloud, corresponding to the 3D point cloud captured at the current location of the vehicle.

In another example, the computing device may be configured to match a two dimensional (2D) LIDAR-based image captured at the current location of the vehicle to previously captured reference 2D LIDAR-based images. The reference 2D LIDAR-based images may be labeled or tagged with associated geographic location information and orientation at a point in time when a respective reference 2D LIDAR-based image may have been captured. Thus, based on the matching, the computing device may be configured to determine the geographic location and orientation information of the vehicle at the current location of the vehicle and identify a corresponding reference 3D point cloud.

Upon receiving the 3D point cloud at the current location of the vehicle and determining a corresponding, obstacle-free, reference 3D point cloud, the computing device may be configured to compare the 3D point cloud to the corresponding reference 3D point cloud to detect the obstacles on the road. In examples, however, the 3D point cloud and the reference 3D point cloud may be misaligned, i.e., the 3D point cloud and the reference 3D point cloud may not be spatially properly aligned. For example, the 3D point cloud may be skewed, translated, or rotated with respect to the corresponding reference 3D point cloud. In these examples, the computing device may not be able to identify obstacles on the road. Additionally or alternatively, because of misalignment, the computing device may falsely identify portions of the 3D point cloud as obstacles, while the portions may not represent actual existent obstacles.

Several factors may cause spatial misalignment between the 3D point cloud and the corresponding reference 3D point cloud. In some examples, the 3D point cloud may have been obtained from a given LIDAR device pose (e.g., a combination of position and orientation of the LIDAR device relative to the road), while the reference 3D point cloud may have been obtained from another vehicle and/or from a different LIDAR device pose. This difference in LIDAR device pose may preclude alignment of the 3D point could with the reference 3D point cloud.

In other examples, the LIDAR device capturing the 3D point cloud may be out of calibration. A slight deviation in calibration of the LIDAR device (e.g., pitch angle of the LIDAR device with respect to the road or the vehicle) may cause inaccuracies in the 3D point cloud, which may cause misalignment between the 3D point cloud and the reference 3D point cloud. In another example, a respective LIDAR device (or devices) used to capture the reference 3D point cloud may be out of calibration; thus the reference 3D point cloud may include inaccuracies that may cause misalignment between the 3D point cloud and the reference 3D point cloud. In still another example, several reference 3D point clouds may be captured of respective portions of a given road, and then later integrated and aligned to compose a single reference 3D point cloud. Integration and alignment of the several reference 3D point clouds may result in inaccuracies that may cause misalignment between the 3D point cloud and the reference 3D point cloud.

Thus, in order to facilitate detection of actual obstacles on the road, and avoid detection of false obstacles, based on a comparison of the 3D point cloud to the reference 3D point cloud, the computing device may be configured to align the 3D point cloud with the reference 3D point cloud.

At block 304, the method 300 includes determining, using the computing device, a planar feature in the 3D point cloud, and a corresponding planar feature in the reference 3D point cloud. For example, a traffic sign with a planar surface may be permanently placed on the road, and thus may be depicted in both the 3D point cloud and the reference 3D point cloud. The computing device, in this example, may be configured to identify the surface of the traffic sign as the planar feature, and a corresponding surface of the traffic sign depicted in the reference 3D point cloud as the corresponding planar feature.

As another example, since a surface of a road is typically locally planar at a given location, the planar feature may relate to a ground plane of the surface of the road. In an example, the computing device may be configured to determine or estimate a planar region of the surface of the road at, or substantially close to, a center of the 3D point cloud, and determining a corresponding planar region in the reference 3D point cloud.

Figure 4A:
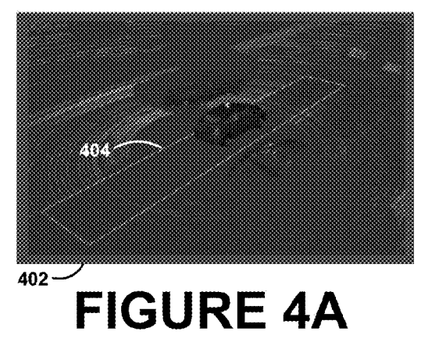
FIG. 4A illustrates an estimated planar feature in a three-dimensional (3D) point cloud, in accordance with an example embodiment.

FIG. 4A illustrates an estimated planar feature in a 3D point cloud, in accordance with an example embodiment. FIG. 4A shows a LIDAR-based image 402 depicting a 3D point cloud captured by a LIDAR device coupled to a vehicle at a given location of a road. The LIDAR-based image 402 depicts a rectangular region 404 of the surface of the road that is planar or substantially planar.

Figure 4B:
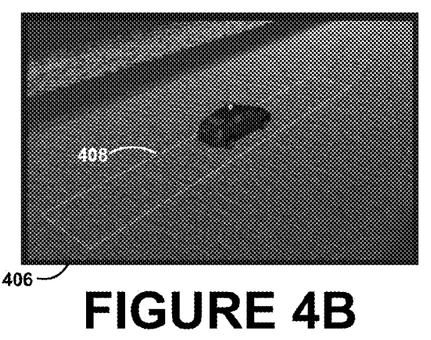
FIG. 4B illustrates an estimated corresponding planar feature in a reference 3D point cloud, in accordance with an example embodiment.

FIG. 4B illustrates an estimated corresponding planar feature in a reference 3D point cloud, in accordance with an example embodiment. FIG. 4B shows a LIDAR-based image 406 depicting the reference 3D point cloud corresponding to the given location of the vehicle, i.e., corresponding to the 3D point cloud depicted in FIG. 4A. The computing device may be configured to determine a corresponding rectangular region 408 that corresponds to the rectangular region 404 of the LIDAR-based image 402. Although rectangular regions are illustrated in FIGS. 4A and 4B, any other geometric shape can be used. A size of the planar feature or region can also vary.

Referring back to FIG. 3, at block 306, the method 300 includes determining, based on a comparison of the planar feature to the corresponding planar feature, a transform. In examples, the planar feature may differ from the corresponding feature in one or more of pitch angle, roll angle, or elevation.

Figure 5:
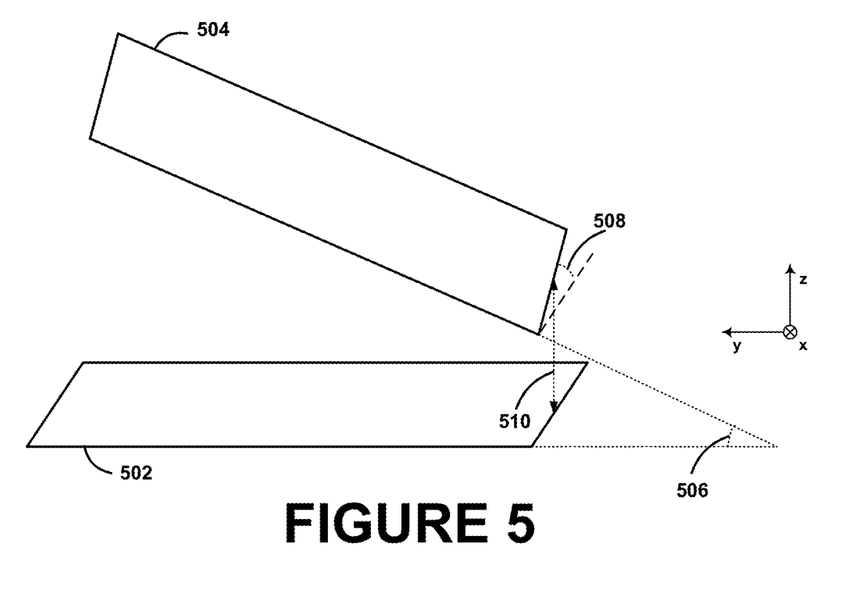
FIG. 5 illustrates a difference in pitch angle, roll angle, and elevation between a planar feature and a corresponding planar feature, in accordance with an example embodiment.

FIG. 5 illustrates a difference in pitch angle, roll angle, and elevation between a planar feature 502 and a corresponding planar feature, in accordance with an example embodiment. FIG. 5 shows an example of the planar feature 502 and the corresponding planar feature 504 having a pitch angle difference 506, a roll angle difference 508, and an elevation difference 510 (in z-axis direction) as examples for illustration only. The transform may be determined based on these differences.

In one example, the transform may include a rigid transformation (isometry) of a vector space that preserves distances between a pair of points in the 3D point cloud (or the reference 3D point cloud), when applied to the pair of points. The rigid transformation in the plane $R^2$ of the planar feature or the corresponding planar feature may be referred to as Euclidean transformation.

In examples, the rigid transformation may include rotation and translation. For instance, the rigid transformation can be decomposed as a rotation (pitch and/or roll) followed by a translation (elevation). The 3D point cloud or the reference 3D point cloud and objects/obstacles depicted in the 3D point cloud or the reference 3D point cloud may keep the same shape and size if the rigid transformation is applied to the 3D point cloud or the reference 3D point cloud.

In an example, the transform, when acting on any vector v in the 3D point cloud or the reference 3D point cloud, may produce a transformed vector T(v) of the form:

$$T(v)=Rv+t \qquad \text{Equation (1)}$$

where $R^T=R^{-1}$ (i.e., R is an orthogonal transformation), and t is a vector associated with a translation of an origin of a coordinate system of the 3D point cloud or the reference 3D point cloud. For instance, elements of the matrix R may be a function of the pitch angle difference 506, the roll angle difference 508, and/or the elevation difference 510.

Referring back to FIG. 3, at block 308, the method 300 includes applying the transform to align the 3D point cloud with the reference 3D point cloud. The transform determined at block 306 of the method 300, can be applied to points of the 3D point cloud or points of the reference 3D point cloud. As an example for illustration, a point in the reference 3D point cloud may be denoted by a vector representing three coordinates of the point in space (X, Y, and Z). The transform, for example, may include a 3×3 matrix with elements of the matrix being a function of roll angle difference, pitch angle difference, or elevation difference. When the transform (i.e., the matrix) is applied to the point, the point is spatially aligned to a corresponding point in the 3D point cloud. Thus, when the transform is applied to points of the 3D point cloud or points of the reference 3D point cloud, the 3D point cloud may be aligned with the 3D reference point cloud, i.e., application of the transform may compensate for the difference in pitch angle, roll angle, or elevation.

Figure 4C:
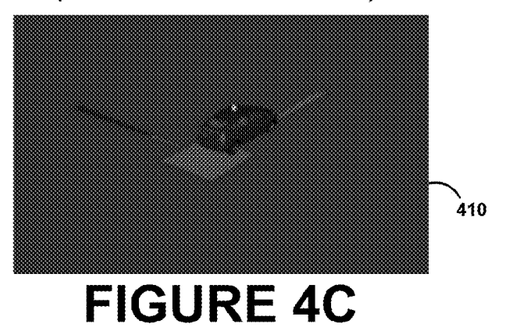
FIG. 4C illustrates the 3D point cloud aligned with the reference 3D point cloud, in accordance with an example embodiment.

FIG. 4C illustrates the 3D point cloud aligned with the reference 3D point cloud, in accordance with an example embodiment. FIG. 4C shows that a correction in pitch angle and roll angle and an adjustment in elevation may have been applied to (i.e., the transform determined at block 306 is applied to points of) the reference 3D point cloud depicted in LIDAR-based image 406 in FIG. 4B. Therefore, image 410 in FIG. 4C depicts the 3D point cloud aligned with the reference 3D point cloud.

Figure 4D:
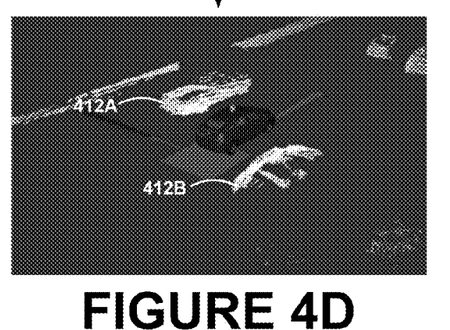
FIG. 4D illustrates detecting obstacles in the 3D point cloud, in accordance with an example embodiment.

FIG. 4D illustrates detecting obstacles in the 3D point cloud, in accordance with an example embodiment. Aligning the 3D point cloud with the reference 3D point cloud may facilitate detection of obstacles on the road on which the vehicle is travelling. For example, in FIG. 4D, the computing device may be configured to compare the 3D point cloud to the reference 3D point, after alignment, to detect vehicles 412A and 412B on the road. In examples, if the 3D point cloud is not aligned with the reference 3D point cloud, the computing device may not have been able to detect the vehicles 412A-B or may have falsely detected obstacles that may not be actual obstacles on the road.

Figure 6A:
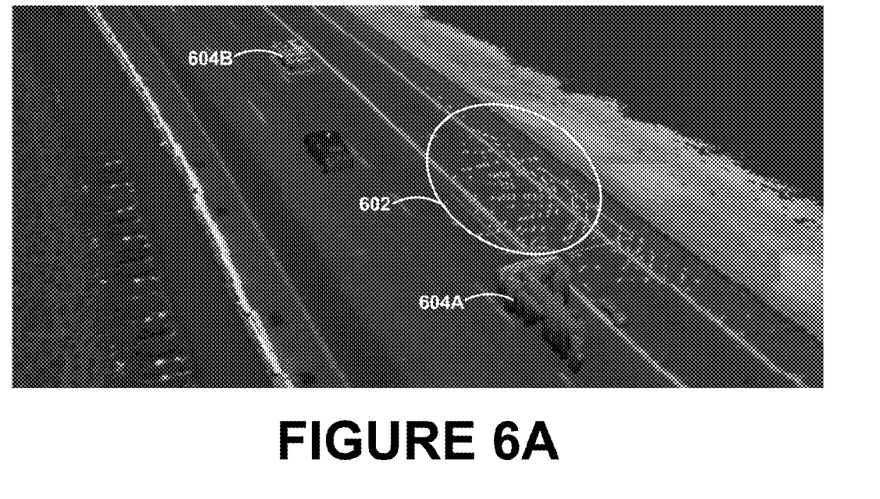
FIG. 6A illustrates a LIDAR-based image depicting a 3D point cloud misaligned with a reference 3D point cloud, in accordance with an example embodiment.

FIG. 6A illustrates a LIDAR-based image depicting a 3D point cloud misaligned with a reference 3D point cloud, in accordance with an example embodiment. In FIG. 6A, the computing device may be configured to detect vehicles 604A and 604B; and, because of a misalignment between the 3D point cloud and the corresponding reference 3D point cloud, the computing device also may be configured to detect false (i.e., nonexistent) obstacles/objects depicted, for instance, as dots in the region 602. Thus, the computing device controlling a vehicle on the road may be configured to modify a control strategy for the vehicle based on a false determination.

Figure 6B:
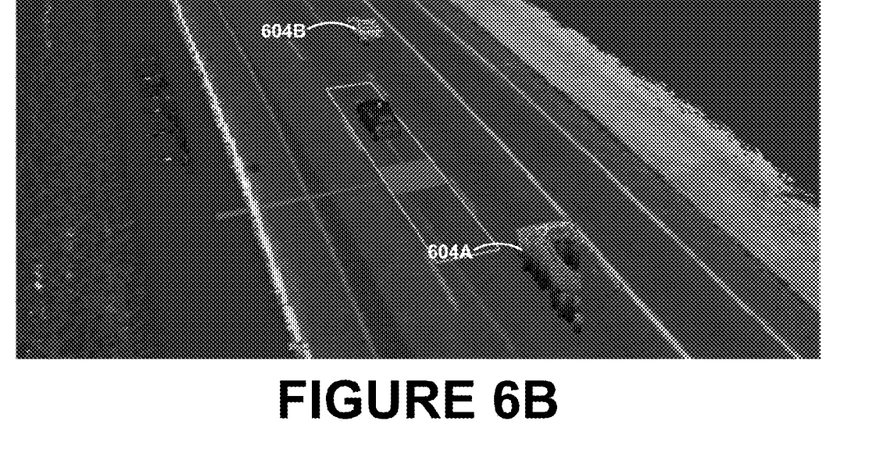
FIG. 6B illustrates the LIDAR-based image after alignment of the 3D point cloud with the reference 3D point cloud, in accordance with an example embodiment.

FIG. 6B illustrates the LIDAR-based image after alignment of the 3D point cloud with the reference 3D point cloud, in accordance with an example embodiment. In FIG. 6B, the 3D point cloud is aligned with the reference 3D point cloud, and thus the false objects in the region 602 are no longer depicted and the computing device may be configured to detect the vehicles 604A-B and modify the control strategy of the vehicle accordingly. For instance, the computing device may be configured to adjust translational velocity, or rotational velocity, or both, of the vehicle based on the modified control strategy to navigate the road and avoid collision with the vehicles 604A-B.

As an example, the computing device may have detected an obstacle (e.g., a stopped vehicle or an accident site) based on a comparison of the 3D point cloud to the reference 3D point cloud. In this example, the computing device may be configured to control the vehicle 402 according to a defensive driving behavior to safely navigate the obstacle. For example, the computing device may be configured to reduce speed of the vehicle, cause the vehicle to change lanes, and/or shift to a position behind and follow while keeping a predetermined safe distance.

These control actions and driving situations are for illustration only. Other actions and situations are possible as well. In one example, the computing device may be configured to control the vehicle based on the modified control strategy as an interim control until a human driver can take control of the vehicle.

Figure 7:
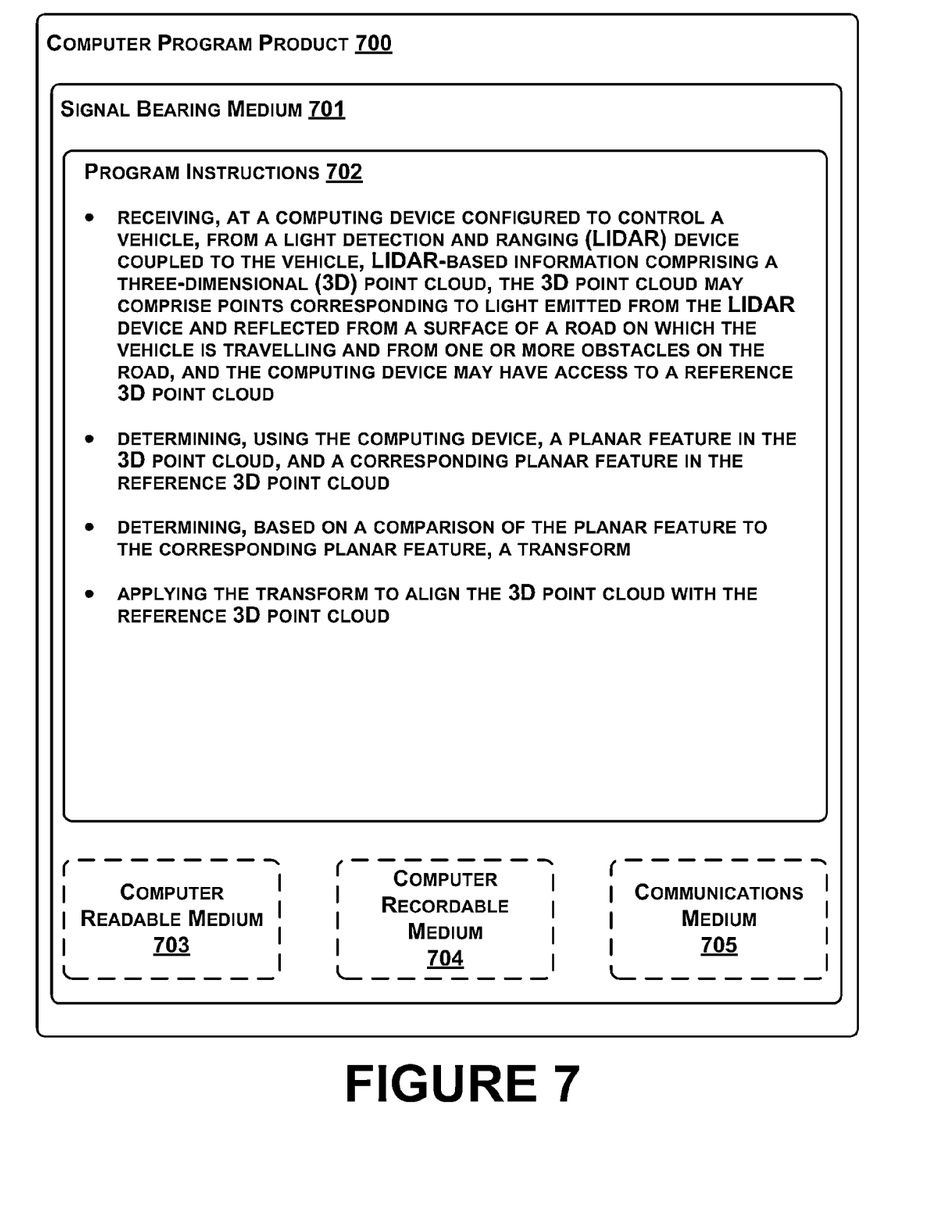
FIG. 7 is a schematic illustrating a conceptual partial view of a computer program, in accordance with an example embodiment.

In some embodiments, the disclosed methods may be implemented as computer program instructions encoded on a computer-readable storage media in a machine-readable format, or on other non-transitory media or articles of manufacture. FIG. 7 is a schematic illustrating a conceptual partial view of an example computer program product 700 that includes a computer program for executing a computer process on a computing device, arranged according to at least some embodiments presented herein. In one embodiment, the example computer program product 700 is provided using a signal bearing medium 701. The signal bearing medium 701 may include one or more program instructions 702 that, when executed by one or more processors may provide functionality or portions of the functionality described above with respect to FIGS. 1-6. Thus, for example, referring to the embodiments shown in FIG. 3, one or more features of blocks 302-308 may be undertaken by one or more instructions associated with the signal bearing medium 701. In addition, the program instructions 702 in FIG. 7 describe example instructions as well.

In some examples, the signal bearing medium 701 may encompass a computer-readable medium 703, such as, but not limited to, a hard disk drive, a Compact Disc (CD), a Digital Video Disk (DVD), a digital tape, memory, etc. In some implementations, the signal bearing medium 701 may encompass a computer recordable medium 704, such as, but not limited to, memory, read/write (R/W) CDs, R/W DVDs, etc. In some implementations, the signal bearing medium 701 may encompass a communications medium 705, such as, but not limited to, a digital and/or an analog communication medium (e.g., a fiber optic cable, a waveguide, a wired communications link, a wireless communication link, etc.). Thus, for example, the signal bearing medium 701 may be conveyed by a wireless form of the communications medium 705 (e.g., a wireless communications medium conforming to the IEEE 802.11 standard or other transmission protocol).

The one or more programming instructions 702 may be, for example, computer executable and/or logic implemented instructions. In some examples, a computing device such as the computing device described with respect to FIGS. 1-6 may be configured to provide various operations, functions, or actions in response to the programming instructions 702 conveyed to the computing device by one or more of the computer readable medium 703, the computer recordable medium 704, and/or the communications medium 705. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
   receiving, at a computing device configured to control a vehicle, from a light detection and ranging (LIDAR) device coupled to the vehicle, LIDAR-based information comprising a three-dimensional (3D) point cloud, wherein the 3D point cloud comprises points corresponding to light emitted from the LIDAR device and reflected from a surface of a road on which the vehicle is travelling and from one or more obstacles on the road, wherein the computing device has access to a reference 3D point cloud of the surface of the road, and wherein the reference 3D point cloud and the 3D point cloud are misaligned;
   determining, using the computing device, a planar feature in the 3D point cloud, and a corresponding planar feature in the reference 3D point cloud;
   determining, based on a comparison of the planar feature to the corresponding planar feature, a transform; and
   applying the transform to points of the 3D point cloud or points of the reference 3D point cloud so as to align the 3D point cloud with the reference 3D point cloud.

2. The method of claim 1, wherein the vehicle is in an autonomous operation mode.

3. The method of claim 1, wherein the planar feature relates to a plane of the surface of the road.

4. The method of claim 1, wherein determining the transform comprises determining a difference in one or more of pitch angle, roll angle, or elevation of the planar feature compared to the corresponding planar feature.

5. The method of claim 1, wherein the reference 3D point cloud relates to an obstacle-free elevation map of the road.

6. The method of claim 1, further comprising detecting the one or more obstacles based on a comparison of the 3D point cloud to the reference 3D point cloud aligned with the 3D point cloud.

7. The method of claim 6, further comprising:
modifying, using the computing device, a control strategy associated with a driving behavior of the vehicle, based on the detecting of the one or more obstacles; and
controlling, using the computing device, the vehicle based on the modified control strategy.

8. The method of claim 1, wherein determining the corresponding planar feature in the reference 3D point cloud comprises determining a latitude, longitude, and yaw angle of the vehicle at a location of the vehicle on the road.

9. A non-transitory computer readable medium having stored thereon instructions executable by a computing device to cause the computing device to perform functions comprising:
receiving, from a light detection and ranging (LIDAR) device coupled to a vehicle, LIDAR-based information comprising a three-dimensional (3D) point cloud, wherein the 3D point cloud comprises points corresponding to light emitted from the LIDAR device and reflected from a surface of a road on which the vehicle is travelling and from one or more obstacles on the road;
determining a planar feature in the 3D point cloud, and a corresponding planar feature in a reference 3D point cloud of the surface of the road, wherein the reference 3D point cloud and the 3D point cloud are misaligned;
determining, based on a comparison of the planar feature to the corresponding planar feature, a transform; and
applying the transform to points of the 3D point cloud or points of the reference 3D point cloud so as to align the 3D point cloud with the reference 3D point cloud.

10. The non-transitory computer readable medium of claim 9, wherein the computing device is configured to control the vehicle in an autonomous operation mode.

11. The non-transitory computer readable medium of claim 9, wherein the function of determining the transform comprises determining a difference in one or more of pitch angle, roll angle, or elevation of the planar feature compared to the corresponding planar feature.

12. The non-transitory computer readable medium of claim 9, wherein the function of applying the transform comprises applying the transform to points in the 3D point cloud or points in the reference 3D point cloud.

13. The non-transitory computer readable medium of claim 9, wherein the reference 3D point cloud relates to an obstacle-free elevation map of the road, and wherein the instructions are further executable by the computing device to cause the computing device to perform functions comprising detecting the one or more obstacles based on a comparison of the 3D point cloud to the reference 3D point cloud aligned with the 3D point cloud.

14. The non-transitory computer readable medium of claim 9, wherein the function of determining the corresponding planar feature in the reference 3D point cloud comprises:
determining a latitude, longitude, and yaw angle of the vehicle at a location of the vehicle on the road; and
identifying a portion in the reference 3D point cloud corresponding to the location of the vehicle; and
determining the corresponding planar feature in the identified portion.

15. A control system for a vehicle, comprising:
a light detection and ranging (LIDAR) device configured to provide LIDAR-based information comprising a three-dimensional (3D) point cloud, wherein the 3D point cloud comprises points corresponding to light emitted from the LIDAR device and reflected from a surface of a road on which the vehicle is travelling and from one or more obstacles on the road; and
a computing device in communication with the LIDAR device, wherein the computing device has access to a reference 3D point cloud of the surface of the road, wherein the reference 3D point cloud and the 3D point cloud are misaligned, and wherein the computing device is configured to:
receive the LIDAR-based information;
determine a planar feature in the 3D point cloud, and a corresponding planar feature in the reference 3D point cloud;
determine, based on a comparison of the planar feature to the corresponding planar feature, a transform; and
apply the transform to points of the 3D point cloud or points of the reference 3D point cloud so as to align the 3D point cloud with the reference 3D point cloud.

16. The system of claim 15, wherein the computing device is further configured to control the vehicle in an autonomous operation mode.

17. The system of claim 15, wherein, to determine the transform, the computing device is configured to:
compare the 3D point cloud to the reference 3D point cloud; and
determine a difference in one or more of pitch angle, roll angle, or elevation of the planar feature compared to the corresponding planar feature.

18. The system of claim 15, wherein the reference 3D point cloud relates to an obstacle-free elevation map of the road, and wherein the computing device is configured to:
compare the 3D point cloud to the reference 3D point cloud aligned with the 3D point cloud; and
detect the one or more obstacles in the 3D point cloud.

19. The system of claim 15, wherein the computing device is configured to apply the transform to points in the 3D point cloud or points in the reference 3D point cloud.

20. The system of claim 15, further comprising a Global Position System (GPS) module, wherein, to determine the corresponding planar feature in the reference 3D point cloud, the computing device is configured to:
receive, from the GPS module, location information relating to a latitude, longitude, and yaw angle of the vehicle at a location of the vehicle on the road;
identify, based on the location information, a portion in the reference 3D point cloud corresponding to the location; and
determine the corresponding planar feature in the identified portion.

* * * * *